United States Patent [19]

Banquy

[11] Patent Number: 4,524,056
[45] Date of Patent: Jun. 18, 1985

[54] PROCESS FOR THE PRODUCTION OF AMMONIA

[75] Inventor: David Banquy, Paris, France

[73] Assignee: Foster Wheeler Energy Corporation, Livingston, N.J.

[21] Appl. No.: 510,790

[22] Filed: Jul. 5, 1983

[51] Int. Cl.³ .................................. C01C 1/04
[52] U.S. Cl. .................................... 423/359
[58] Field of Search ............... 423/359, 360, 361

[56] References Cited

U.S. PATENT DOCUMENTS

| | | | |
|---|---|---|---|
| 4,296,085 | 10/1981 | Banquy | 252/373 |
| 4,298,588 | 11/1981 | Pinto | 423/359 |
| 4,312,851 | 1/1982 | Isalski et al. | 423/359 |
| 4,409,196 | 10/1983 | Skinner et al. | 423/359 |

Primary Examiner—John Doll
Assistant Examiner—Wayne A. Langel

Attorney, Agent, or Firm—Marvin A. Naigur; John E. Wilson; Robert D. Bajefsky

[57] ABSTRACT

A process for the production of ammonia, comprising the steps of: (a) gasifying a feedstock containing carbon and a source of hydrogen with air as the only source of free oxygen, to produce a raw synthesis gas comprising nitrogen, hydrogen, carbon oxides, and methane; (b) subjecting the raw synthesis gas to a shift conversion reaction; (c) removing the carbon oxides from the shift converted raw synthesis gas to produce a purified synthesis gas; (d) mixing the purified synthesis gas with a hydrogen-rich gas to form a final synthesis gas; (e) injecting the final synthesis gas into an ammonia synthesis loop to produce ammonia and a purge gas; (f) separating the purge gas cryogenically, to produce a methane-rich gas, a nitrogen-rich gas, and the hydrogen-rich gas; and (g) recycling the hydrogen-rich gas to step (d). The methane-rich stream is at least partially recycled to step (a). Sulfur compounds, if necessary, may be removed from the raw synthesis gas.

9 Claims, 4 Drawing Figures

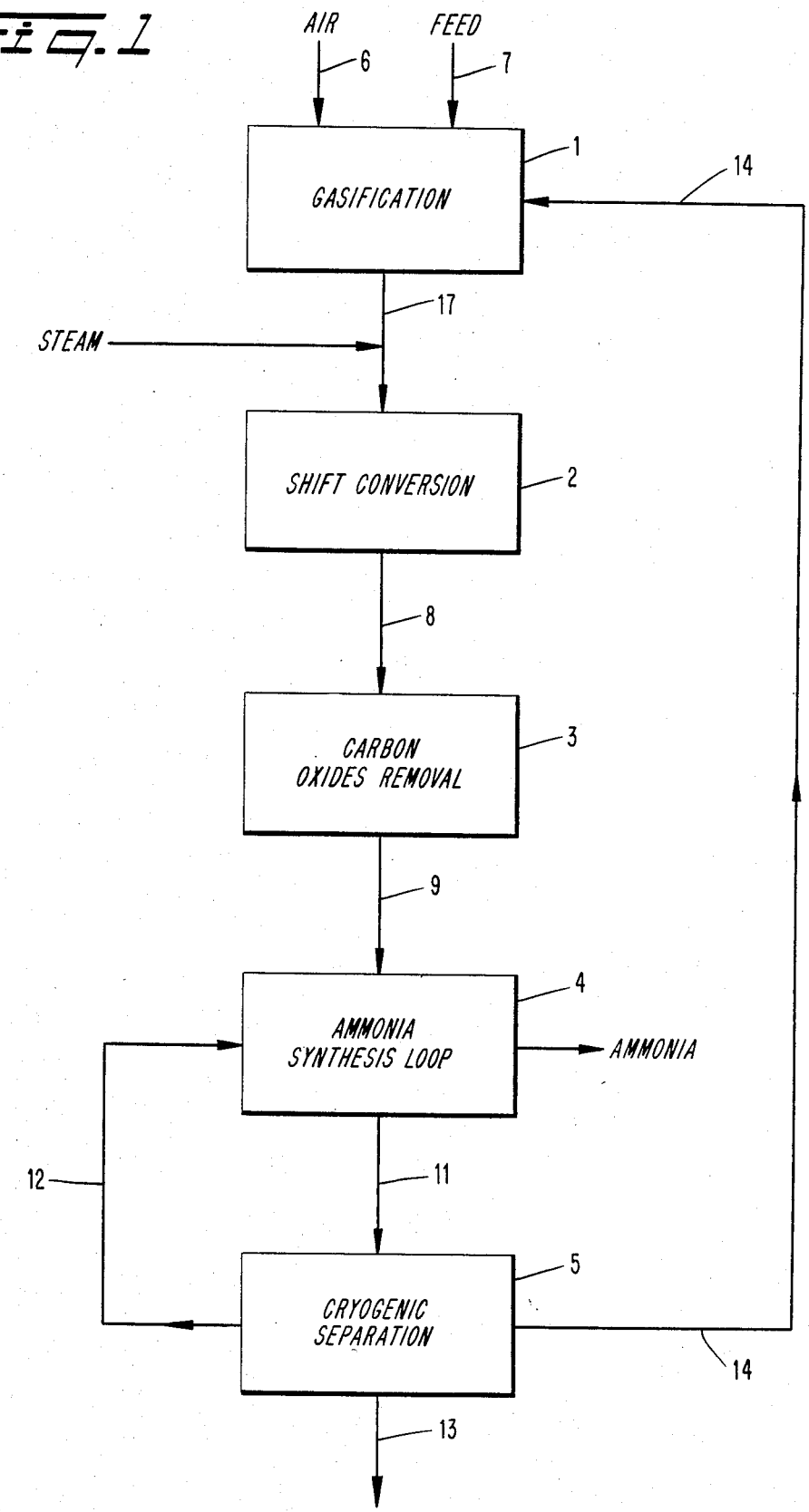

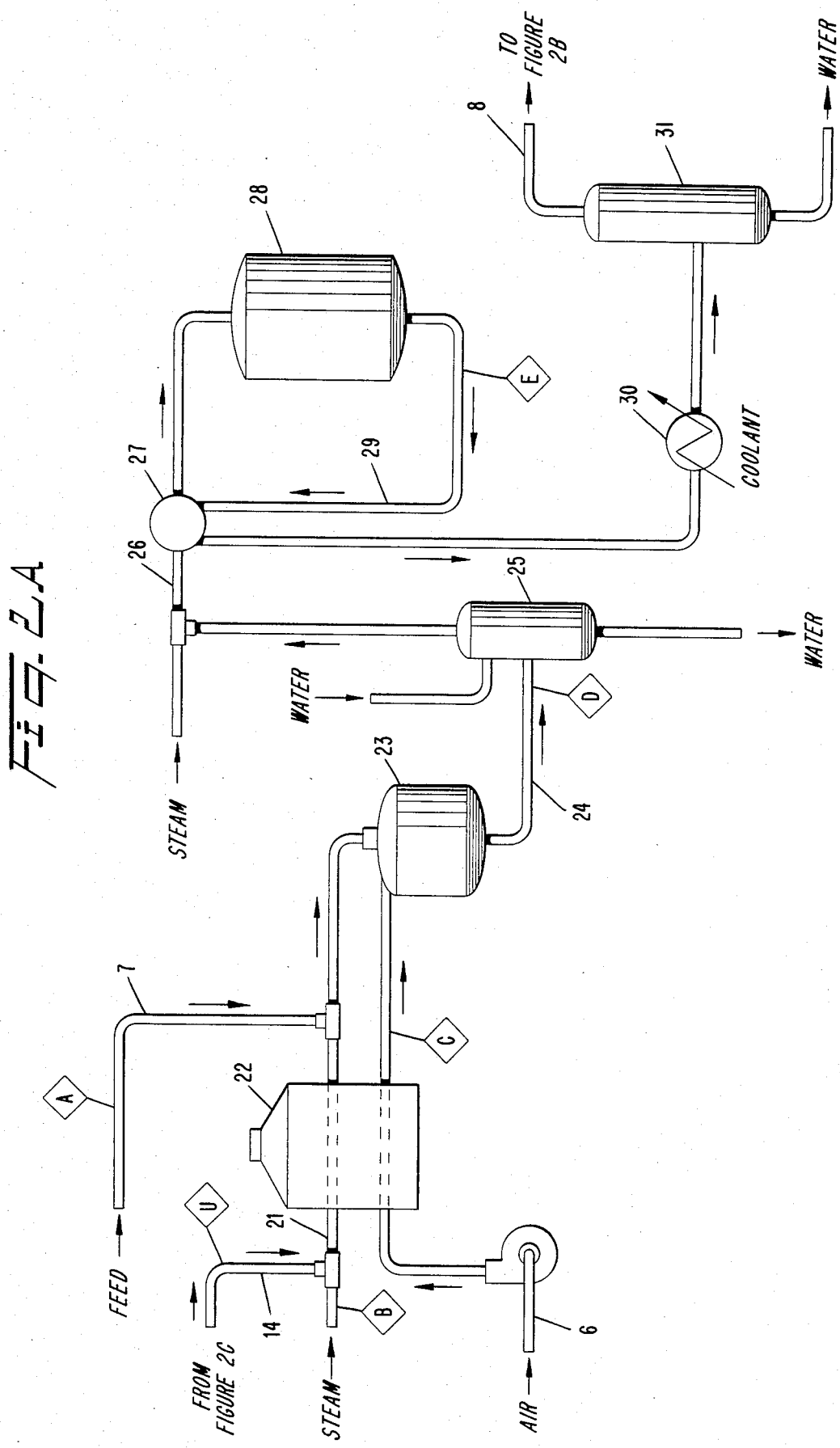

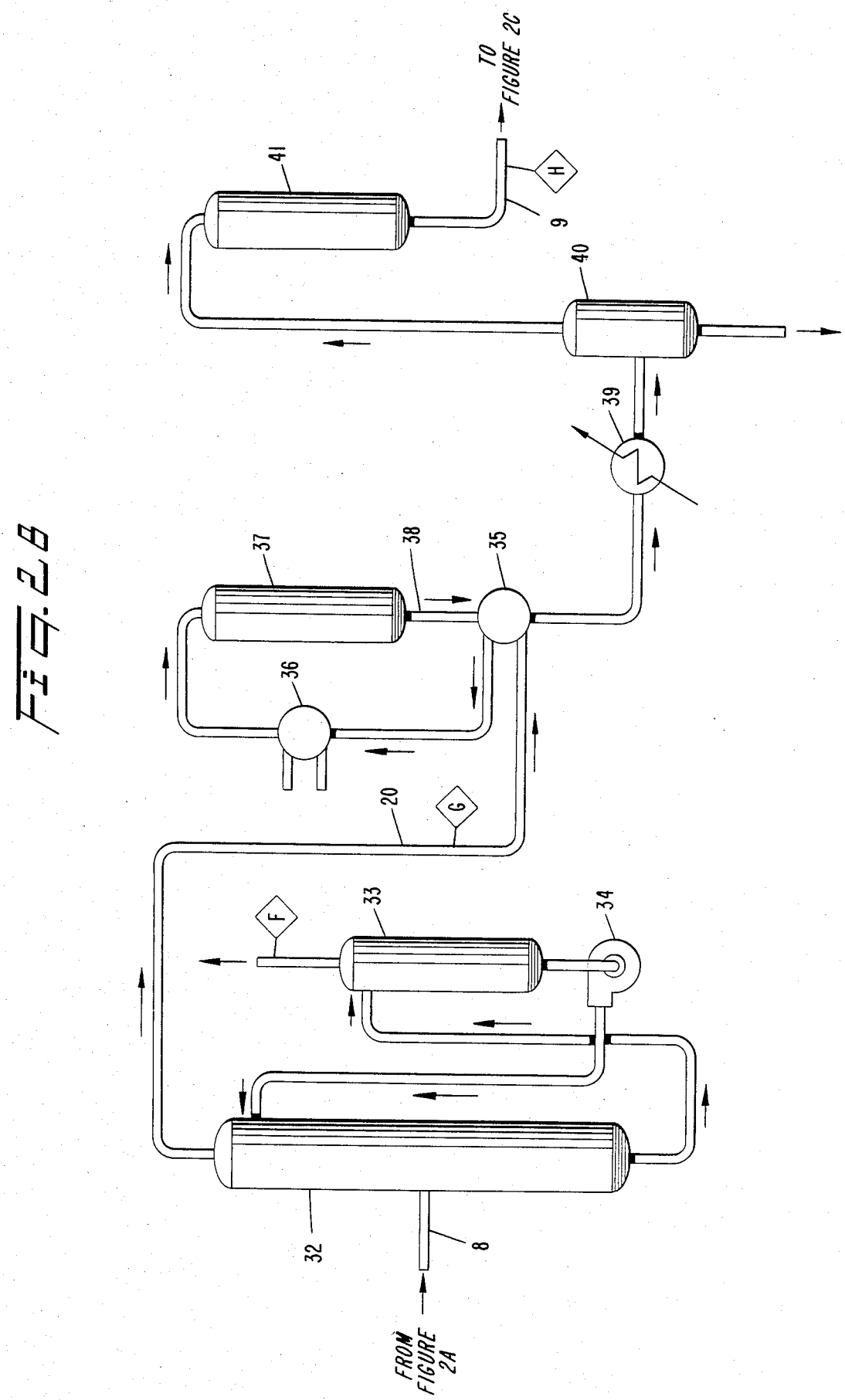

2

PROCESS FOR THE PRODUCTION OF AMMONIA

BACKGROUND OF THE INVENTION

This invention relates to a process for the production of ammonia from a synthesis gas produced by partial oxidation without the presence of a catalyst.

The commercial synthesis of ammonia is usually achieved from a synthesis gas containing hydrogen and nitrogen, in a ratio preferably close or equal to the stoichiometric $H_2:N_2$ ratio of 3:1, and inert gases such as methane and argon which should be minimized as much as possible. The synthesis gas may be produced by catalytic steam reforming, such as the process described in U.S. Pat. No. 4,153,673, catalytic oxygen reforming, such as the process described in French Pat. No. 1,158,617 and an article entitled "Topsoe-SBA Autothermal Process" in *Nitrogen* 35–38 (May 17, 1962), or partial oxidation, such as the process described in U.S. Pat. No. 3,929,429. In partial oxidation, air has not been used in the reactor because it would result in a synthesis gas containing much more nitrogen than is required for ammonia synthesis. Either pure oxygen, or oxygen-enriched air have been used in these processes. In U.S. Pat. No. 2,795,559, however, a process is described in which air is used as the only source of free oxygen in the partial oxidation reactor. The excess nitrogen is removed in a cryogenic separation step before ammonia synthesis in order to obtain the proper $H_2:N_2$ ratio of 3:1 to feed the synthesis loop.

SUMMARY OF THE INVENTION

An object of the present invention is to provide an improved process for ammonia production from a synthesis gas produced by partial oxidation.

Another object of the present invention is to provide a process using air as the only source of the oxygen in the partial oxidation reactor without the need to remove excess nitrogen before the synthesis loop and without the need to produce pure oxygen.

Another object of this invention is to provide an improved process for ammonia production with very high hydrogen efficiency in the synthesis loop, very low overall energy consumption, and reduced capital cost.

Additional objects and advantages of the invention will be set forth in part in the description that follows, and in part will be obvious from that description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the invention comprises a process for the production of ammonia, comprising the steps of:

(a) gasifying, by partial oxidation, a carbon containing feedstock with air as the only source of free oxygen to produce a raw synthesis gas comprising hydrogen, nitrogen, carbon oxides, and methane;

(b) subjecting the raw synthesis gas to a shift conversion to convert carbon monoxide to hydrogen and carbon dioxide;

(c) removing the carbon oxides from the raw synthesis gas after it has been subjected to shift conversion to produce a purified synthesis gas;

(d) injecting the purified synthesis gas into an ammonia synthesis loop forming ammonia in said loop, and extracting ammonia and a purge gas stream from said loop;

(e) separating the purge gas cryogenically to produce a hydrogen-rich stream and a methane-rich stream;

(f) recycling the hydrogen-rich stream to said synthesis loop;

(g) recycling the methane-rich stream to the gasification step.

If the synthesis gas contains sulfur, the sulfur should be removed prior to injecting the synthesis gas into the synthesis loop. This can be accomplished either before or after the shift conversion step.

BRIEF DESCRIPTION OF THE DRAWINGS

FIG. 1 is a block diagram showing the basic process steps of the invention.

FIG. 2, comprising FIGS. 2A, 2B, and 2C, is a schematic diagram showing a preferred embodiment of the present invention.

DESCRIPTION OF THE PREFERRED EMBODIMENTS

Figure 2C:
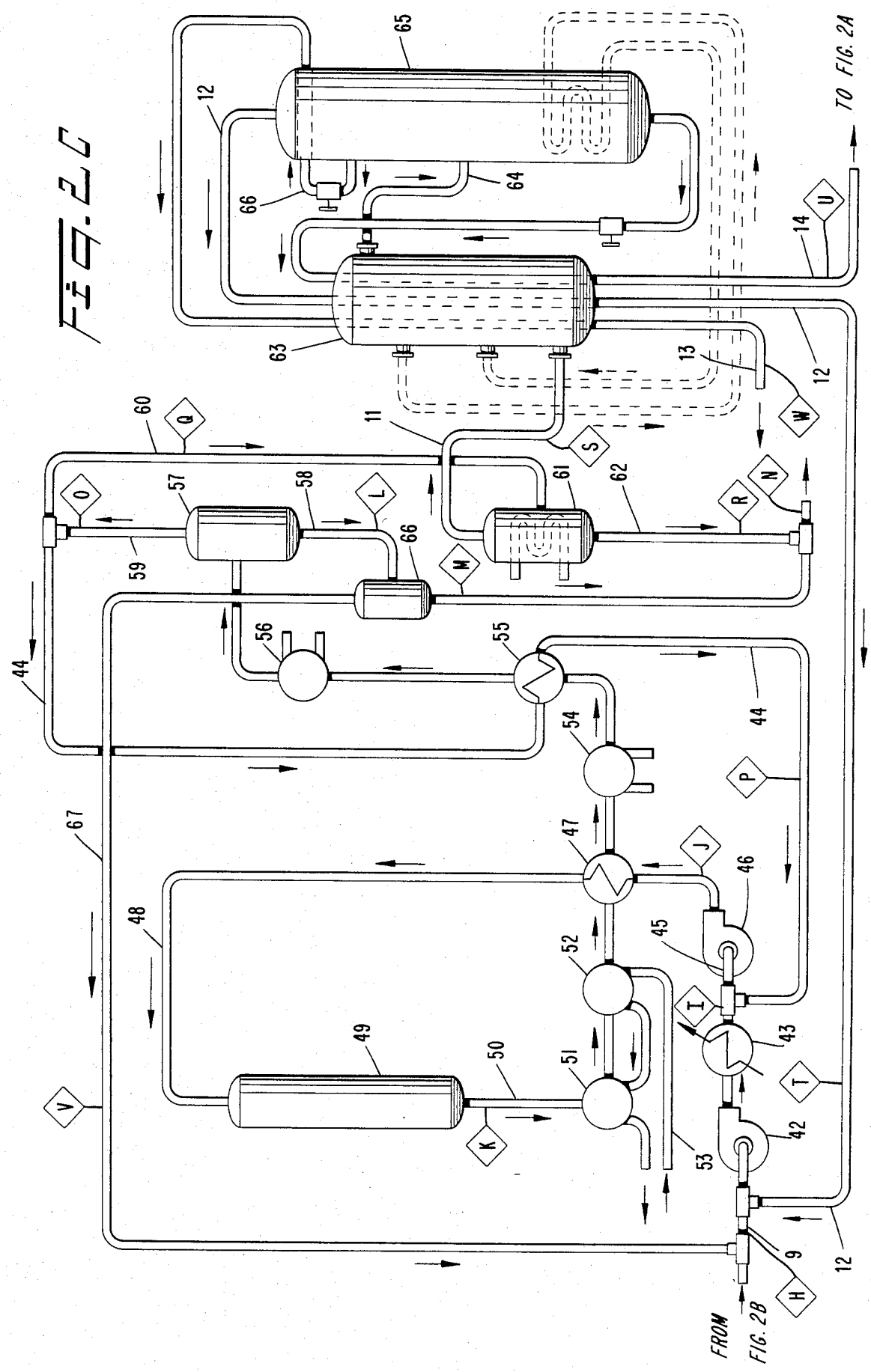

Reference will now be made to the presently preferred embodiments of the invention.

It has been discovered that if air is used as the source of oxygen in gasification by partial oxidation, the excess nitrogen contained in the synthesis gas produced may be advantageously removed after the ammonia synthesis loop rather than before as taught by U.S. Pat. No. 2,795,559. This is possible because the kinetics of the ammonia synthesis reaction are improved by the presence of excess nitrogen in the reaction mixture because nitrogen adsorption on the catalyst is the controlling step in the reaction. Furthermore, according to the invention, a hydrogen-rich stream is separated in the nitrogen removal operation and this hydrogen-rich stream is recycled to the synthesis loop. This separation and recycle results in higher overall hydrogen efficiency. In addition, a methane-rich stream is obtained and is advantageously recycled to the gasification reactor and used as transport gas for the feedstock.

As shown in FIG. 1, the basic process of the invention comprises gasification 1, shift conversion 2, carbon oxides removal 3, ammonia synthesis loop 4, cryogenic separation 5, recycle of a hydrogen-rich stream 12 to the synthesis loop, and recycle of methane-rich stream 14 to the gasification step. Excess nitrogen is removed via 13.

The gasification step utilized in the present invention may comprise any of the processes commercially available or disclosed in the technical or patent literature for partial oxidation. The feedstock supplied to the gasification step 1 may be composed of any carbonaceous material, such as a hydrocarbon (gas, liquid or solid), coal, shale, wood, any organic compound, or any combination thereof. It may be a liquid, (such as an oil, an oil-coal slurry, or a coal-water slurry), a gas, (such as a vaporized hydrocarbon), or a two-phase mixture, (such as a partially vaporized hydrocarbon or coal fines dispersed in a transport gas).

The operating pressure of the gasification step is preferably above about 20 atm, and may be as high as about 100 atm. The operating temperature may be between 800° C. and about 1700° C. In partial oxidation processes using a hydrocarbon feedstock, the temperature should be between about 1100° C. and about 1400° C. When coal is gasified in an entrained bed reactor, the temperature should be between about 1300° C. and about 1700° C. When gasifying coal in a fluid bed reactor, the temperature should be between about 950° C. and about 1200° C.

The molal ratio of $(H_2+CO)/N_2$ of the effluent gas from the gasification step depends essentially on the feedstock elemental analysis, the reactor operating temperature, and the air temperature at the inlet of the gasification reactor. This ratio is a direct expression of the amount of excess nitrogen compared to the stoichiometric amount required for ammonia synthesis, since the amount of hydrogen and carbon monoxide in the effluent gas is approximately the amount of hydrogen which will be present after shift conversion.

If the gasification temperature is about between 1400° C. and about 1500° C., the molal ratio should be in the range of about 0.7 to about 1.4. If the temperature is between about 850° C. and about 1100° C., the ratio should be between about 1.7 and about 2.4. Gasification preferably occurs between about 850° C. and about 1100° C., because it produces less excess nitrogen which must be removed downstream of the synthesis loop.

In most gasification processes, methane is essentially the only hydrocarbon contained in the effluent gas from the gasification step. The methane content of the effluent gas may range from about 0.2 to about 10 mole percent on a dry basis. However, in a preferred embodiment of the present invention, the methane content is from about 2 to about 6 mole percent on a dry basis. When the feedstock is coal, these preferred conditions are achieved by using a fluid bed gasification reactor. When the feedstock contains hydrocarbons, the preferred conditions are achieved by using a fluidized bed containing fine carbon particles. To produce a synthesis gas suitable for ammonia production, the raw synthesis gas produced by the gasification step should undergo several processing steps to convert CO to $CO_2$ and $H_2$ (shift conversion) and to remove $CO_2$, any $H_2S$ and COS present, and trace amounts of CO. These steps are shown in blocks 2 and 3 on FIG. 1.

Sulfur removal, when necessary, may be performed before shift conversion. This would allow the use of a conventional low temperature (200°-230° C.) shift conversion catalyst containing copper and zinc. The use of this catalyst would result in a gas having a residual CO content on the order of 0.3 to 0.6 volume percent on a dry basis. However, this processing scheme is not energy efficient because of the required cooling-heating cycle for the synthesis gas. Alternately, shift conversion may be performed just after the gasification step, and before removal of sulfur and $CO_2$. If shift conversion is performed before sulfur removal, the catalyst used must be sulfur tolerant. These catalysts are commercially available and contain cobalt and molybdenum as active components. An example of a sulfur tolerant catalyst is disclosed in U.S. Pat. No. 4,233,180.

Any sulfur impurities are generally removed simultaneously with carbon dioxide. Any known process may be used to remove carbon dioxide and sulfur. The "BENFIELD," "VETROCOKE," "CATACARB," monoethanolamine or diethanolamine processes using a chemical solvent. These processes consume a substantial amount of heat for regenerating the solvent. Therefore, the preferred $CO_2$ and sulfur removal processes for this invention are those using a physical solvent. Suitable physical solvents already in commercial use are propylene carbonate (Fluor), methanol (Rectisol), dimethylether of polyethylene glycol (Selexol), and N-methyl-2-pyrolidone (Purisol). If a sulfur-free $CO_2$ stream is desired (such as for urea synthesis), the sulfur and $CO_2$ should be absorbed separately in two successive steps using different streams of the same solvent and different absorption temperatures.

Trace amounts of carbon oxides must then be removed. This step can be accomplished by contacting the gas with a suitable solvent such as a copper-ammonium liquor. However, a preferred method for trace carbon oxide removal is catalytic methanation whereby hydrogen is reacted with the carbon oxides to produce methane.

This purified synthesis gas is then supplied to the ammonia synthesis loop. Ammonia and a purge gas are withdrawn from the synthesis loop and a hydrogen-rich gas stream and a methane-rich gas stream are recovered from the purge gas by cryogenic separation.

A preferred embodiment of the present invention is shown in FIG. 2. FIG. 2A illustrates the gasification and shift conversion steps. FIG. 2B shows the steps of carbon dioxide and sulfur removal and trace carbon oxides removal. FIG. 2C shows the ammonia synthesis loop and separation of the purge gas.

A methane-rich stream 14, recycled from a cryogenic distillation column 65 (shown in FIG. 2C), is combined with steam to form feed stream 21 and is preheated in a heater 22, usually a fired heater, to a temperature between 100° C. and 700° C., and preferably between 300° C. and 500° C. Air, supplied via line 6, is compressed and is then preheated, either in heater 22 or in another heater (not shown), to a temperature between 200° C. and 850° C., and preferably between 500° C. and 750° C. Feedstream 7 is then mixed with stream 21. The preheated air and feedstock/methane streams are then introduced into a partial oxidation reactor 23. The reactor may be operated under the conditions described above.

The effluent gas 24 from gasification reactor 23 is the raw synthesis gas and is quenched directly with water in drum 25. Alternatively, it may be cooled by indirect heat exchange to produce steam and then quenched and scrubbed with water. Scrubbing with water removes ash and unreacted carbon particles that may be carried with the gas. If the feedstock is coal, the water used to scrub the gas will be rich in ash. This water may be discarded or it can be recycled to the drum 25 after the ash is removed. If the feedstock is a fuel oil, the water will contain mostly carbon particles with only traces of ash. This carbon-water slurry can be treated to recover the carbon particles which can be recycled to the gasification step. The clean water can be recycled to the drum 25.

The gas leaving drum 25 is, if necessary, mixed with additional steam 5 to form feed gas stream 26, and is then preheated in a heat exchanger 27 to a temperature between 280° C. and 330° C. and supplied to shift conversion reactor 28. The shift conversion reactor 28 may contain one or several catalyst beds, with either indirect heat exchange or water quench between the beds to control the reaction temperature and remove part of the heat of the exothermic shift conversion reaction. In shift conversion reaction 28, CO reacts with water vapor to produce $CO_2$ and $H_2$. The effluent stream from reactor 28 is cooled in heat exchangers 27 and 30 and any condensed water is removed in separator 31.

The pressure in shift conversion reactor 28 is essentially the same as that in gasification reactor 23, except for the pressure drop between the two reactors due to fluid flow. The CO content in the effluent gas from shift conversion reactor 28, when using a sulfur tolerant catalyst, is in the range of 0.6 to 1.5 volume percent on a dry basis, and usually about 1.0 percent. The outlet temperature from reactor 28 is in the range of 300° C. to 340° C. Moreover, essentially all the COS contained in the raw synthesis gas leaving gasification reactor 23 is converted to $H_2S$ and $CO_2$ in shift conversion reactor 28. Only a few ppm by volume of COS will be in the effluent stream 29.

Although not shown in FIG. 2A, residual CO in effluent stream 29 can be selectively oxidized to carbon dioxide. This step would reduce appreciably the amount of hydrogen that would have to be consumed during methanation of residual carbon oxides in a later step.

The synthesis gas stream 8 leaving separater 31 is subjected to $CO_2$ and sulfur removal in an absorber 32. (See FIG. 2B.) The absorber 32 operates at about the same pressure as shift conversion reactor 28. The solvent extracted from the bottom of absorber 32 is regenerated at near atmospheric pressure in regenerator 33, repressurized by pump 34 and recycled to the scrubber 32.

The effluent gas stream 20 is sent to trace carbon oxides removal step. As embodied herein, trace carbon oxides removal is accomplished by methanation in reactor 37. The effluent gas stream 20 is preheated in heat exchanger 35, and, if necessary, a second heat exchanger 36. The temperature of the gas at the inlet of the methanation reactor 37 should be about 270° C. to about 330° C. The reactor 37 may contain any conventional methanation catalyst. These catalysts usually contain nickel as the active component. The methanation reaction is slightly exothermic, which raises the gas temperature by about 15° C. to 50° C. The effluent gas 38 from methanation reactor 37 contains less than 20 ppm by volume of carbon oxides and is the purified synthesis gas. It is cooled in exchangers 35 and 39 to ambient temperature. Any condensed water is separated from gas stream 38 in separator 40. The gas leaving separator 40 contains essentially hydrogen and nitrogen, in a ration of $H_2/N_2$ which can vary widely from 0.7 to 2.4, preferably 1.5 to 2.0. This gas may be dried using molecular sieves or any similar type of adsorbent.

In an alternate embodiment (not shown), the purified synthesis gas leaving separator 40 may be used for ammonia synthesis without drying. In that case, the synthesis gas would be injected into the ammonia synthesis loop (shown in FIG. 2C) at a point where it is washed with anhydrous liquid ammonia before it is contacted with the synthesis catalyst.

The gas leaving separator 40 or dryer 41 may be used without further compression in the ammonia synthesis loop, or it may be compressed in compressor 42 if the synthesis loop pressure is higher than that of the gasification pressure. If synthesis gas compressor 42 is not used, then the pressure in the synthesis loop is preferably in the range of about 50 to about 90 atm. When the ammonia synthesis pressure is appreciably higher than that of the gasification pressure, then the gasification pressure would be preferably in the range of 20 to 80 atm, and the ammonia synthesis pressure preferably in the range of 70 to 200 atm. The compressor 42 would preferably be a single stage or a single barrel apparatus.

The purified synthesis gas is injected into an ammonia synthesis loop. As embodied herein, any process for ammonia synthesis may be used. FIG. 2C represents a typical process in which the ammonia produced is recovered by cooling and condensation. At very low ammonia synthesis pressures, such as 50 to 80 atm, the ammonia may be recovered by water scrubbing, such as the process described in U.S. Pat. No. 4,153,673.

As shown in FIG. 2C, in a preferred embodiment of the invention, purified synthesis gas stream 9 is first mixed with a recycled hydrogen-rich gas 12 and recycled gas stream 67 and the mixture is compressed in compressor 42 and cooled in cooler 43. If cryogenic separation is carried out at a pressure which is appreciably higher than the pressure in the synthesis gas stream 9, then the hydrogen-rich gas 12 may be mixed with purified synthesis gas 9 at an intermediate point of compression in compressor 42. The gas leaving cooler 43 is then mixed with the synthesis loop recycle gas 44, to form stream 45 which is further compressed in a recycle compressor 46, the pressure differential of which is equal to the pressure drop across the synthesis loop. The gas leaving compressor 46 has an ammonia content between 2 and 7 mole percent. The gas is preheated in exchanger 47 to form gas stream 48 and then injected at various points in an ammonia synthesis reactor 49 at a temperature between 180° C. and 300° C., as is the usual practice in the ammonia industry.

Synthesis reactor 49 may be any commonly used synthesis reactor, and contains a conventional ammonia synthesis catalyst, such as, for example, one made essentially of magnetic iron oxide, promoted with certain additives such as oxides of potassium, cerium, and beryllium. Upon contact with the catalyst, part of the synthesis gas reacts to form ammonia. The exothermic heat of reaction raises the temperature of the gas mixture in the reactor, and the outlet temperature of the catalyst is in the range of 320° C. to 500° C., and usually 350° C. to 420° C. The heat contained in the gas 50 leaving synthesis reactor 49 is recovered successively in waste heat boiler 51, to make steam at high pressure, then in water preheater 52, and then in feed gas preheater 47. The gas 50 is then cooled in cooler 54, in exchanger 55, and in refrigerant cooler 56, using a liquid refrigerant such as ammonia, to reach a temperature usually between 2° C. and 12° C., in order to condense the ammonia produced as much as possible. The liquid ammonia is separated from the gaseous reactants in separator 57, and the gas leaving the separator is split into two fractions. The first and generally largest fraction, recycle gas 44, is passed through exchanger 55 and then mixed with the purified synthesis gas.

The second fraction, a high pressure purge gas 60, is cooled in condenser 61 to a temperature usually below $-15°$ C. to recover ammonia contained therein. The gas effluent from condenser 61 is purge gas stream 11. In an alternate embodiment (not shown), the ammonia contained in the high pressure purge gas may be removed and recovered by scrubbing with water.

The liquid ammonia stream 58 is separated from residual gas in separator 66 and then combined with liquid ammonia stream 62 to form the product of the ammonia synthesis loop. The residual gas stream is recycled to gas stream 9.

Purge gas stream 11 contains an appreciable amount of nitrogen, methane, and argon since these gases accumulate in the ammonia synthesis loop. The amount of purge gas withdrawn from the loop should be selected so that the methane content of the recycle gas 44 remains preferably below about 20 mole percent, and also such that the molal ratio of $H_2/N_2$ in the recycle gas 44 remains preferably above 2.0.

The purge gas is next treated to recover a hydrogen-rich stream. This hydrogen-rich stream should have an $H_2/N_2$ ratio greater than 3/1 and is recycled to the ammonia synthesis loop. A methane-rich gas, which can be at least partially recycled to the gasification step after mixing with the main feedstock, is also recovered. This methane-rich gas can advantageously be used as transport gas for feeding the pulverized feedstock to the gasification reactor particularly when the feedstock is a solid such as coal or wood. A nitrogen-rich stream, is also recovered. This stream may be used as fuel if it contains enough methane, or discarded to atmosphere after power and refrigeration recovery.

Purge gas stream 11 is first cooled in cryogenic exchanger 63, to a temperature between $-160°$ C. and $-195°$ C., and then injected at an appropriate level of a distillation tower 65. The tower contains appropriate fractionation devices such as trays, or packings, or any other gas-liquid contact means. In the process of cooling in exchanger 63, at least part of the purge gas may be extracted, as shown by the dotted lines, to supply reboiling heat at the bottom of distillation tower 65, and then returned to exchanger 63 at an appropriate point. Other means of supplying reboiling heat for tower 65 may be used.

The operating pressure of the distillation tower 65 could be any level between the pressure of ammonia synthesis and the pressure of gasification. The preferred pressure of the cryogenic tower 65 is, however, as close as possible to the ammonia synthesis pressure. This will result in a savings of energy during the recycle of hydrogen-rich gas stream 12.

A methane-rich stream 14 is extracted as a liquid from the bottom of tower 65 at a temperature between $-140°$ C. and $-185°$ C. It is expanded through a valve or through an expansion turbine to a pressure slightly above the pressure of gasification reactor 23 and then vaporized and heated in exchanger 63 to supply refrigeration for the incoming purge gas stream 11. It is then at least partially recycled to the gasification reactor 23 by mixing with the feedstream 7 as shown in FIG. 2A.

A nitrogen-rich stream 6 is extracted as a liquid at an intermediate point of column 65. It is expanded through a valve or through an expansion turbine to a pressure below 6 atm, and is then passed through the shell side of an exchanger located at the top of column 65 wherein it supplies refrigeration for reflux condensing a portion of the gas rising in column 65 and flowing in the tube side of the exchanger. The nitrogen-rich stream 13 contains a large part of the argon contained in the purge gas. If it has sufficient heating value as a result of the presence of methane and hydrogen, it may be used as a fuel. Alternatively, it may be discarded to the atmosphere. The venting to the atmosphere of the nitrogen-rich stream eliminates excess nitrogen and argon from the ammonia synthesis loop.

The rising gas becomes hydrogen-rich stream 12 leaving the top of tower 65 at a temperature between $-170°$ C. and $-200°$ C. The nitrogen-rich stream 13 as well as the hydrogen-rich stream are then passed through exchanger 63 to supply refrigeration to the incoming purge gas 11. The hydrogen-rich stream is then recycled to the synthesis loop, either through a separate compressor (not shown), or through compressor 46 after mixing with the purified synthesis gas 10.

In a preferred embodiment of this invention, all the refrigeration requirements of the cryogenic distillation for hydrogen recovery are supplied by the expansion of the nitrogen-rich stream 13 and the methane-rich stream 14. In another embodiment of the invention, part of the refrigeration requirements are supplied by an external source of refrigeration, such as an ammonia refrigeration cycle. In another embodiment, part of the refrigeration requirements are supplied by the expansion of the incoming gas before entering the cryogenic distillation tower 65, and the remaining refrigeration requirements are supplied by the expansion of the nitrogen-rich stream 13 and the methane-rich stream 14.

The heat recovery on the various process streams are not shown in detail in FIG. 2 because heat recovery techniques are well known in the art.

EXAMPLE

The Table shows anticipated temperatures, gas pressures, flow rates and compositions at the significant positions in a process based on FIG. 2, for the production of 1,379.8 mectric tons per day of ammonia.

The stream letters of The Table correspond to those of FIG. 2. Stream A is the coal feedstock which is made of:

dry coal havinng the following elemental composition in weight percent:
Carbon: 69.52%
Hydrogen: 5.33%
Oxygen: 10.02%
Nitrogen: 1.25%
Sulfur: 3.86%
Ash: 10.02%
Humidity of 10.64 kg $H_2O$/100 kg dry coal, or a total of 400.3 kg mol/h $H_2O$.

Stream B is the process steam added to the wet coal feedstock. Stream U is the methane-rich fraction coming from the cryogenic separation and mixed with the coal feedstock. The mixture of streams B and U is preheated to 500° C. in heater 22 and then mixed with the coal feedstock stream A. The process air (stream C) is also preheated to 760° C. in heater 22 before being injected into gasification reactor 23.

The gas effluent (stream D) from reactor 23 is at 1,057° C. and 38.4 atm g. It is then shift converted in reactor 28 in the presence of a sulfur tolerant shift catalyst. The raw synthesis gas is then purified for $H_2S$ and $CO_2$ removal in scrubber 32, using polyethylene glycol dimethylether as solvent at a temperature of about 6° C. The solvent is regenerated in tower 33 under vacuum. The solvent is also continuously stripped of its water in a side section not shown on FIG. 2.

After methanation in reactor 37 and drying in dryer 41, the synthesis gas (stream H) is mixed with the low pressure flash gas (stream V) and the mixture thereof is compressed to the synthesis loop pressure of 178.7 atm g, and then mixed with recycle gas (stream P) of the synthesis loop. The hydrogen-rich stream (stream T) coming from the cryogenic separation is mixed with the main synthesis gas stream. The low pressure flash gas, stream V is first compressed before mixing with stream H.

It will be obvious to those skilled in the art that various modifications and alterations may be made in the process of the invention without departing from the scope or spirit of the invention.

TEMPERATURE, PRESSURE, AND FLOW RATE OF PROCESS GAS STREAMS AS SHOWN IN FIG. 2

| GAS STREAM NUMBER | A* | B | C | D | E | F | G | H | I | J | K |
|---|---|---|---|---|---|---|---|---|---|---|---|
| H2 Kg · MOL/H | | | | 2,845.3 | 6,093.8 | 60.9 | 6,032.9 | 5,365.4 | 6,146.3 | 113,025.7 | 107,962.3 |
| N2 Kg · MOL/H | | | 6,091.3 | 6,755.9 | 6,755.9 | 67.6 | 6,688.3 | 6,688.3 | 7,524 | 589,578 | 587,890.2 |
| NH3 Kg · MOL/H | | | | | | | | | 28.7 | 28,986.6 | 32,362.2 |
| Ar Kg · MOL/H | | | 72.9 | 155.2 | 155.2 | — | 155.2 | 152.2 | 194.7 | 18,168.7 | 18,168.7 |
| O2 Kg · MOL/H | | | 1,634 | 0 | | | | | | | |
| CO Kg · MOL/H | | | | 3,461.8 | 213.3 | — | 213.3 | — | — | | |
| CO2 Kg · MOL/H | | | 2.6 | 499.5 | 3,751 | 3,744.1 | 6.9 | — | — | | |
| CH4 Kg · MOL/H | | | | 724.5 | 724.5 | 14.5 | 710 | 930.2 | 1,051.1 | 92,598.6 | 92,598.6 |
| H2O Kg · MOL/H | | 1,083.8 | 20.9 | 739 | 5,952.3 | — | — | — | — | — | — |
| H2S Kg · MOL/H | | | | 78.7 | 81.7 | 81.7 | | | | | |
| COS Kg · MOL/H | | | | 3 | — | — | | | | | |
| TOTAL Kg · MOL/H | | 1,083.8 | 7,821.7 | 15,500.5 | 23,727.7 | | 13,806.6 | 13,139.1 | 14,944.8 | 842,357.6 | 838,982 |
| PRESSURE ATM. G. | 41.2 | 41.2 | 42.5 | 38.4 | 37.5 | −0.7 | 36.8 | 35.9 | 35.9 | 187.3 | 183.1 |
| TEMPERATURE °C. | 20 | 500 | 760 | 1057 | 300 | 80 | 6 | 38 | 33 | 37 | 370 |

| GAS STREAM NUMBER | L | M | N | O | P | Q | R | S | T | U | V | W |
|---|---|---|---|---|---|---|---|---|---|---|---|---|
| H2 Kg · MOL/H | 14.1 | 0.6 | 0.6 | 107,948.2 | 106,879.4 | 1,068.8 | — | 1,068.8 | 767.4 | — | 13.5 | 301.4 |
| N2 Kg · MOL/H | 15.8 | 0.8 | 0.8 | 587,874.4 | 582,054 | 5,820.5 | — | 5,820.5 | 820.7 | 634.4 | 15.0 | 4,365.4 |
| NH3 Kg · MOL/H | 3,114.7 | 3,086.0 | 3,375.6 | 29,247.5 | 28,957.9 | 289.6 | 289.6 | — | | | 28.7 | |
| Ar Kg · MOL/H | 15 | 0.8 | 0.8 | 18,153.7 | 17,974.0 | 179.7 | — | 179.7 | 25.3 | 82.3 | 14.2 | 72.1 |
| O2 Kg · MOL/H | | | | | | | | | | | | |
| CO Kg · MOL/H | | | | | | | | | | | | |
| CO2 Kg · MOL/H | | | | | | | | | | | | |
| CH4 Kg · MOL/H | 135.6 | 14.7 | 14.7 | 92,463 | 91,547.5 | 915.5 | — | 915.5 | — | 907.3 | 120.9 | 8.2 |
| H2O Kg · MOL/H | — | — | — | — | — | — | — | — | — | — | — | — |
| H2S Kg · MOL/H | | | | | | | | | | | | |
| COS Kg · MOL/H | | | | | | | | | | | | |
| TOTAL Kg · MOL/H | 3,295.2 | 3,102.9 | 3,392.5 | 835,686.8 | 827,412.8 | 8,274.1 | 289.6 | 7,984.5 | 1,613.4 | 1,624 | 192.3 | 4,747.1 |
| PRESSURE ATM. G. | 179.5 | 6.9 | 6.9 | 179.5 | 178.7 | 197.5 | 6.9 | 71 | 70 | 44 | 6.9 | 0.5 |
| TEMPERATURE °C. | −6 | −6 | −9 | −9 | 32 | −6 | −33 | −33 | −9 | −9 | −6 | −6 |

*TOTAL WET COAL FEEDSTOCK IS 75,986.8 KG/HR

What is claimed is:

1. A process for producing ammonia from a carbon containing feedstock comprising:
    (a) subjecting said feedstock to a catalyst free partial oxidation reaction with air as the only source of free oxygen in a reactor operating adiabatically, at a temperature between 800° C. and 1700° C., thereby producing a raw synthesis gas containing hydrogen, carbon oxides, methane, and nitrogen, with a methane content of less than 10 mole percent on a dry basis and a molal ratio of $(H_2+CO)/N_2$ of 0.7 to 2.4;
    (b) subjecting said raw synthesis gas to a shift conversion reaction to convert essentially all the carbon monoxide contained therein to carbon dioxide and hydrogen;
    (c) subjecting the shift converted raw synthesis gas to a purification for removing the carbon oxides and the sulfur compounds from said gas, thereby obtaining a purified synthesis gas containing a molal ratio of $H_2/N_2$ of less than 2.4;
    (d) injecting said purified synthesis gas having a molal ratio of $H_2/N_2$ of less than 2.4 into an ammonia synthesis loop to produce ammonia and recovering said ammonia from the loop;
    (e) extracting a purge gas from said ammonia synthesis loop, and treating said purge gas to obtain a hydrogen-rich stream, a nitrogen-rich stream, and a methane-rich stream;
    (f) recycling said hydrogen-rich stream to said ammonia synthesis loop; and
    (g) recycling at least partially said methane-rich stream to processing step (a).

2. A process according to claim 1 wherein the methane content of the gas effluent from step (a) is in the range of 2 to 6 mole percent on a dry basis.

3. A process according to claim 2 wherein the molal ratio of $(H_2+CO)/N_2$ in the gas effluent from step (a) is in the range of 1.7 to 2.4.

4. A process according to claim 1, 2, or 3 whereby said purge gas contains less than 20 mole percent methane and has a molal ratio of $H_2/N_2$ above 2.0.

5. A process according to claim 1, 2, or 3 wherein the treatment of said purge gas in step (e) is carried out by distillation in the temperature range of −140° to −185° at the bottom of the distillation tower, and in the temperature range of −170° to −200° C. at the top of the distillation tower.

6. A process according to claim 5 wherein all the refrigeration requirements of the distillation at low temperature are supplied by the expansion of the nitrogen-rich stream to a pressure of less than 6 atm absolute and by the expansion of the methane-rich stream to a pressure essentially equal to that of processing step (a).

7. A process according to claim 1, 2, or 3 wherein processing steps (a), (b), (c), and (d) are carried out at essentially the same pressure level.

8. A process according to claim 1, 2, or 3 wherein processing steps (a), (b), and (c) are carried out in the pressure range of 20 to 60 atm, and processing step (d) is carried out in the pressure range of 70 to 160 atm.

9. A process according to claim 1 wherein the treatment of said purge gas is carried out at a pressure between that of step (a) and that of step (d).

* * * * *